United States Patent
Fukami et al.

(10) Patent No.: US 11,117,491 B2
(45) Date of Patent: Sep. 14, 2021

(54) ELECTRIC VEHICLE CONTROL DEVICE

(71) Applicant: HONDA MOTOR CO., LTD., Tokyo (JP)

(72) Inventors: Kenta Fukami, Wako (JP); Atsushi Sakurai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 191 days.

(21) Appl. No.: 16/504,504

(22) Filed: Jul. 8, 2019

(65) Prior Publication Data

US 2020/0023750 A1 Jan. 23, 2020

(30) Foreign Application Priority Data

Jul. 17, 2018 (JP) .............................. JP2018-133923

(51) Int. Cl.
*H02J 7/00* (2006.01)
*B60L 58/25* (2019.01)
*B60W 20/13* (2016.01)
*B60L 53/66* (2019.01)

(52) U.S. Cl.
CPC ............. *B60L 58/25* (2019.02); *B60L 53/665* (2019.02); *B60W 20/13* (2016.01); *B60L 2260/56* (2013.01)

(58) Field of Classification Search
None
See application file for complete search history.

(56) References Cited

U.S. PATENT DOCUMENTS

| | | | |
|---|---|---|---|
| 6,561,295 B1* | 5/2003 | Kuroda | B60L 58/10 180/65.25 |
| 2010/0089669 A1* | 4/2010 | Taguchi | B60L 11/1816 180/65.1 |
| 2012/0280050 A1* | 11/2012 | Tonozuka | B60L 58/24 236/94 |
| 2019/0315232 A1* | 10/2019 | Ing | B60L 58/24 |

FOREIGN PATENT DOCUMENTS

JP        2006-206225        8/2006

* cited by examiner

*Primary Examiner* — Arun C Williams
(74) *Attorney, Agent, or Firm* — Rankin, Hill & Clark LLP (57) ABSTRACT

During running of an electric vehicle, a battery temperature control section performs preliminary temperature adjustment processing so that a temperature of the battery at a point of time of arrival at a reachable charging station is within a suitable charging temperature range. When the preliminary temperature adjustment processing is performed, a running control section performs processing for maintaining a remaining capacity securing condition that an estimated remaining capacity is equal to or exceeds a remaining capacity criterion value, the estimated remaining capacity resulting from subtraction of an estimated running electricity amount and an estimated temperature control electricity amount from a remaining capacity of the battery at a current point of time.

7 Claims, 6 Drawing Sheets

ELECTRIC VEHICLE CONTROL DEVICE

INCORPORATION BY REFERENCE

The present application claims priority under 35 U.S.C. § 119 to Japanese Patent Application No. 2018-133923 filed on Jul. 17, 2018. The content of the application is incorporated herein by reference in its entirety.

BACKGROUND OF THE INVENTION

Field of the Invention

The present invention relates to an electric vehicle control device.

Description of the Related Art

Conventionally, electric vehicle control devices each configured to, during running of an electric vehicle, cool a battery via a cooling device and heat the battery via a heating device so that when the electric vehicle arrives at a charging station, a temperature of the battery has reached a temperature enabling efficient charging have been proposed (see, for example, Japanese Patent Laid-Open No. 2006-206225).

As stated above, in a running electric vehicle, when a cooling device is actuated to cool a battery or a heating device is actuated to heat the battery, power being supplied from the battery is consumed by the cooling device or the heating device as well as a motor for running. Therefore, it is necessary to make the electric vehicle run and manage a temperature of the battery while preventing a shortage of a remaining capacity of the battery until the electric vehicle reaches a charging station.

The present invention has been made in view of the above circumstances and an object of the present invention is to provide an electric vehicle control device that when a necessity for charging a battery at a charging station on the way raises during running of an electric vehicle, can more properly perform control of running to the charging station on the way and management of a temperature of the battery for charging.

SUMMARY OF THE INVENTION

An electric vehicle control device according to an aspect of the present invention is an electric vehicle control device including a battery, a battery temperature adjustment section that is actuated by power supplied from the battery to heat or cool the battery and a running driving section that is actuated by power supplied from the battery, the electric vehicle control device including: a current position recognition section that detects a current position of the electric vehicle; a reachable charging station recognition section that recognizes a reachable charging station that is a charging station located in a direction of travel of the electric vehicle, the charging station being expected to be reachable based on a remaining capacity of the battery; a charging necessity determination section that determines whether or not charging of the battery at the reachable charging station is necessary; a battery temperature control section that during running of the electric vehicle, if the charging necessity determination section determines that charging of the battery at the reachable charging station is necessary, performs preliminary temperature adjustment processing for actuating the battery temperature adjustment section so that a temperature of the battery at a point of time of arrival of the electric vehicle at the reachable charging station is within a predetermined suitable charging temperature range; and a running control section that when the battery temperature control section performs the preliminary temperature adjustment processing, performs processing for maintaining a remaining capacity securing condition that an estimated remaining capacity is equal to or exceeds a remaining capacity criterion value, the estimated remaining capacity resulting from subtraction of an estimated running electricity amount that is an expected value of an amount of electricity supplied from the battery to the running driving section until arrival of the electric vehicle at the reachable charging station and an estimated temperature control electricity amount that is an expected value of an amount of electricity supplied from the battery to the battery temperature adjustment section until arrival of the reachable charging station at the electric vehicle from a remaining capacity of the battery at a current point of time.

Also, the running control section may perform running limitation processing for limiting a speed or acceleration of the electric vehicle as the processing for maintaining the remaining capacity securing condition.

Also, when the battery temperature control section performs the preliminary temperature adjustment processing, if the remaining capacity securing condition can be maintained even though the electric vehicle runs at a speed exceeding a prescribed maximum speed for a road on which the electric vehicle runs, the running control section may set an upper limit speed of the electric vehicle as the prescribed maximum speed, in the running limitation processing.

Also, in the preliminary temperature adjustment processing, the battery temperature control section may actuate the battery temperature adjustment section until the temperature of the battery becomes at least equal to or below an upper limit of the suitable charging temperature range, and when the battery temperature control section performs the preliminary temperature adjustment processing, the running control section may bring an upper limit speed of the electric vehicle close to a prescribed maximum speed for a road on which the electric vehicle runs in a state in which the temperature of the battery is maintained to be equal to or below the upper limit of the suitable charging temperature range, in the running limitation processing.

Also, in the preliminary temperature adjustment processing, when the battery temperature control section actuates the battery temperature adjustment section so that the temperature of the battery becomes at least equal to or below an upper limit of the suitable charging temperature range, if the temperature of the battery raises, the battery temperature control section may actuate the battery temperature adjustment section that the temperature of the battery becomes constant.

Also, in the preliminary temperature adjustment processing, if the temperature of the battery is lowered to a cooling reference temperature within the suitable charging temperature range, the battery temperature control section may actuate the battery temperature adjustment section so that the temperature of the battery is maintained at the cooling reference temperature.

Also, when the battery temperature control section performs the preliminary temperature adjustment processing, the running control section may perform the processing for maintaining the remaining capacity securing condition, by successively determining whether or not the remaining capacity securing condition is met until arrival of the electric vehicle at the reachable charging station.

With an electric vehicle control device according to an aspect of the present invention, when charging of a battery becomes necessary during running of an electric vehicle, preliminary temperature adjustment processing for actuating a battery temperature adjustment section so that a temperature of the battery at the point of time when the electric vehicle arrives at a reachable charging station is in a suitable charging temperature range. Then, when the preliminary temperature adjustment processing is performed, processing for maintaining a remaining capacity securing condition that an estimated remaining capacity is equal to or exceeds a remaining capacity criterion value, the estimated remaining capacity resulting from subtraction of an estimated running electricity amount that is an expected value of an amount of electricity supplied from the battery to a running driving section until the electric vehicle arrives at the reachable charging station, and an estimated temperature control electricity amount that is an estimated value of an amount of electricity supplied from the battery to the battery temperature adjustment section until the electric vehicle arrives at the reachable charging station from a remaining capacity of the battery, is performed.

As stated above, performance of the preliminary temperature adjustment processing and the processing for maintaining the remaining capacity securing condition enables more properly performing running control until the electric vehicle arrives at the reachable charging station and management of the temperature of the battery in preparation for charging.

DETAILED DESCRIPTION OF THE PREFERRED EMBODIMENTS

An embodiment of an electric vehicle control device according to the present invention will be described with reference to FIGS. 1 to 6.

[1. Configuration of Electric Vehicle Control Device]

Figure 1:
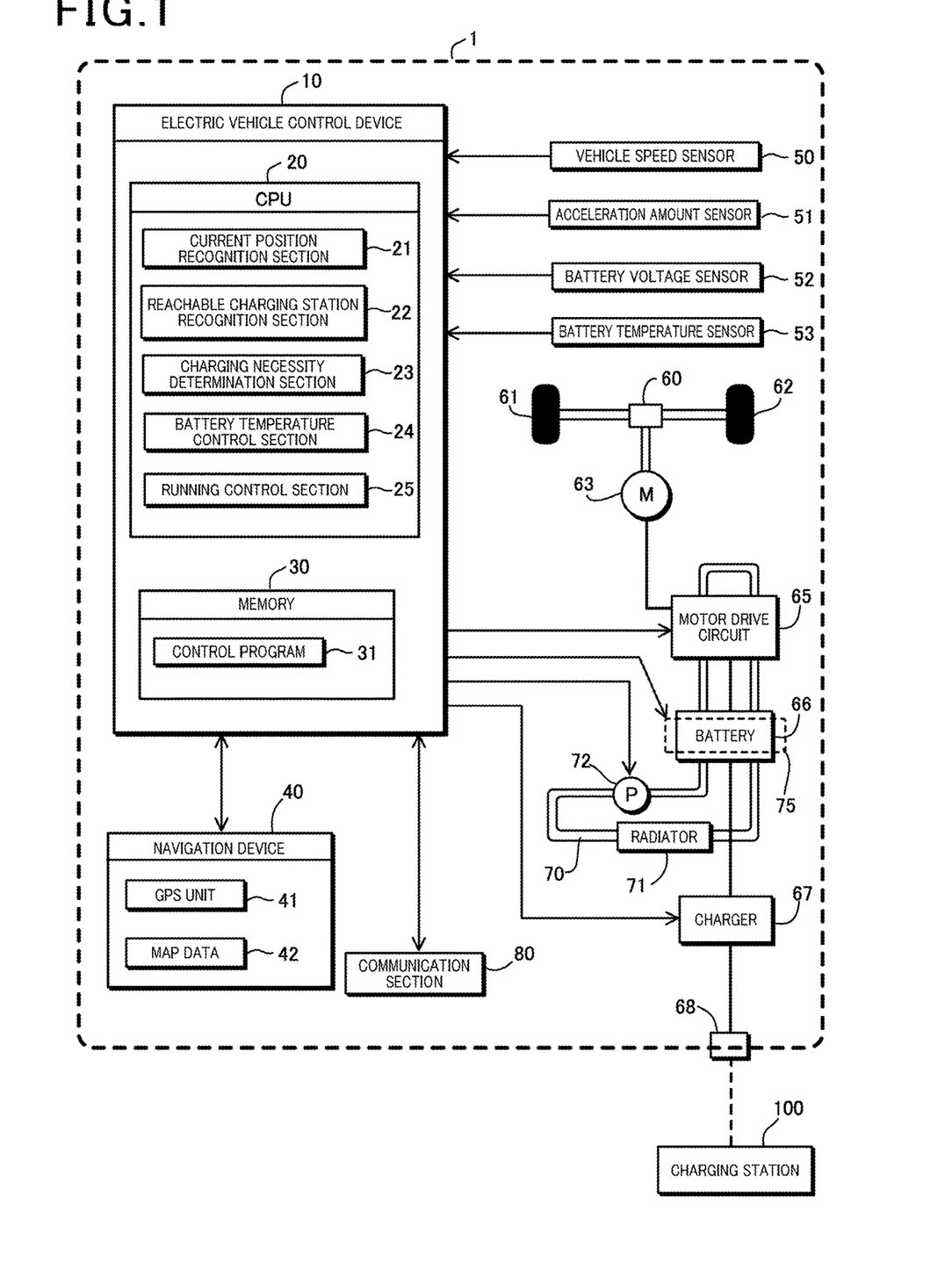
FIG. 1 is a diagram of a configuration of an electric vehicle with an electric vehicle control device mounted therein.

With reference to FIG. 1, an electric vehicle control device 10 according to an aspect of the present embodiment is provided in an electric vehicle 1. In the below, the electric vehicle control device 10 is also referred to as "control device 10". The electric vehicle 1 is an electric car that runs by actuating a motor 63 (corresponding to the running driving section in the present invention) by means of power supplied from a battery 66 to drive wheels 61, 62 via a differential gear 60.

The electric vehicle 1 includes a motor driving circuit 65 that is actuated by the power supplied from the battery 66 and applies a driving voltage to the motor 63, and a charger 67 that when the charger 67 is connected to a charging station 100 via a charging port 68, charges the battery 66 with power supplied from the charging station 100. The electric vehicle 1 also includes a refrigerant circulation channel 70 disposed around the motor driving circuit 65 and the battery 66, a circulation pump 72 that circulates a refrigerant charged in the circulation channel 70, a radiator 71 that causes the refrigerant in the circulation channel 70 to release heat, and a battery heater 75 that heats the battery 66. The circulation channel 70, the radiator 71, the circulation pump 72 and the battery heater 75 form the battery temperature adjustment section in the present invention.

Furthermore, the electric vehicle 1 includes a vehicle speed sensor 50 that detects a vehicle speed of the electric vehicle 1, an acceleration amount sensor 51 that detects an amount of operation of an acceleration pedal (not illustrated), a battery voltage sensor 52 that detects a voltage of the battery 66, a battery temperature sensor 53 that detects a temperature of the battery 66, a communication section 80 that performs external communication and a navigation device 40 that gives a guide for a route to a destination. The navigation device 40 includes a GPS (Global Positioning System) unit 41 that detects a current position of the electric vehicle 1 and a map data 42. The map data 42 can be received from, e.g., a traffic information server via a communication section 80.

The control device 10 is an electric circuit unit formed by, e.g., a CPU (Central Processing Unit) 20, a memory 30 and a non-illustrated interface circuit. As a result of reading and execution of a control program 31 for the electric vehicle 1, the control program 31 being stored in the memory 30, the CPU 20 functions as a current position recognition section 21, a reachable charging station recognition section 22, a charging necessity determination section 23, a battery temperature control section 24 and a running control section 25.

The current position recognition section 21 acquires information on the current position detected by the GPS unit 41 from the navigation device 40 and recognizes the current position of the electric vehicle 1. The reachable charging station recognition section 22 recognizes a direction of travel of the electric vehicle 1 from a status of running of the electric vehicle 1 with reference to the current position of the electric vehicle 1 recognized by the current position recognition section 21 and the map data 42 included in the navigation device 40.

Also, the reachable charging station recognition section 22 calculates a remaining capacity (remaining charge amount) of the battery 66 based on, e.g., the voltage of the battery 66 detected by the battery voltage sensor 52. Then, the reachable charging station recognition section 22 recognizes a reachable charging station that is a charging station located in the direction of travel of the electric vehicle 1, the charging station being expected for the electric vehicle 1 to reach from the current remaining capacity of the battery 66.

Note that the reachable charging station recognition section 22 may be configured to, based on the remaining capacity of the battery 66, expect a travelable distance for the electric vehicle 1, provide an instruction for a search for a charging station located within the travelable distance to the navigation device 40 and acquires a result of the search from the navigation device 40 to recognize a reachable charging station.

Figure 2:
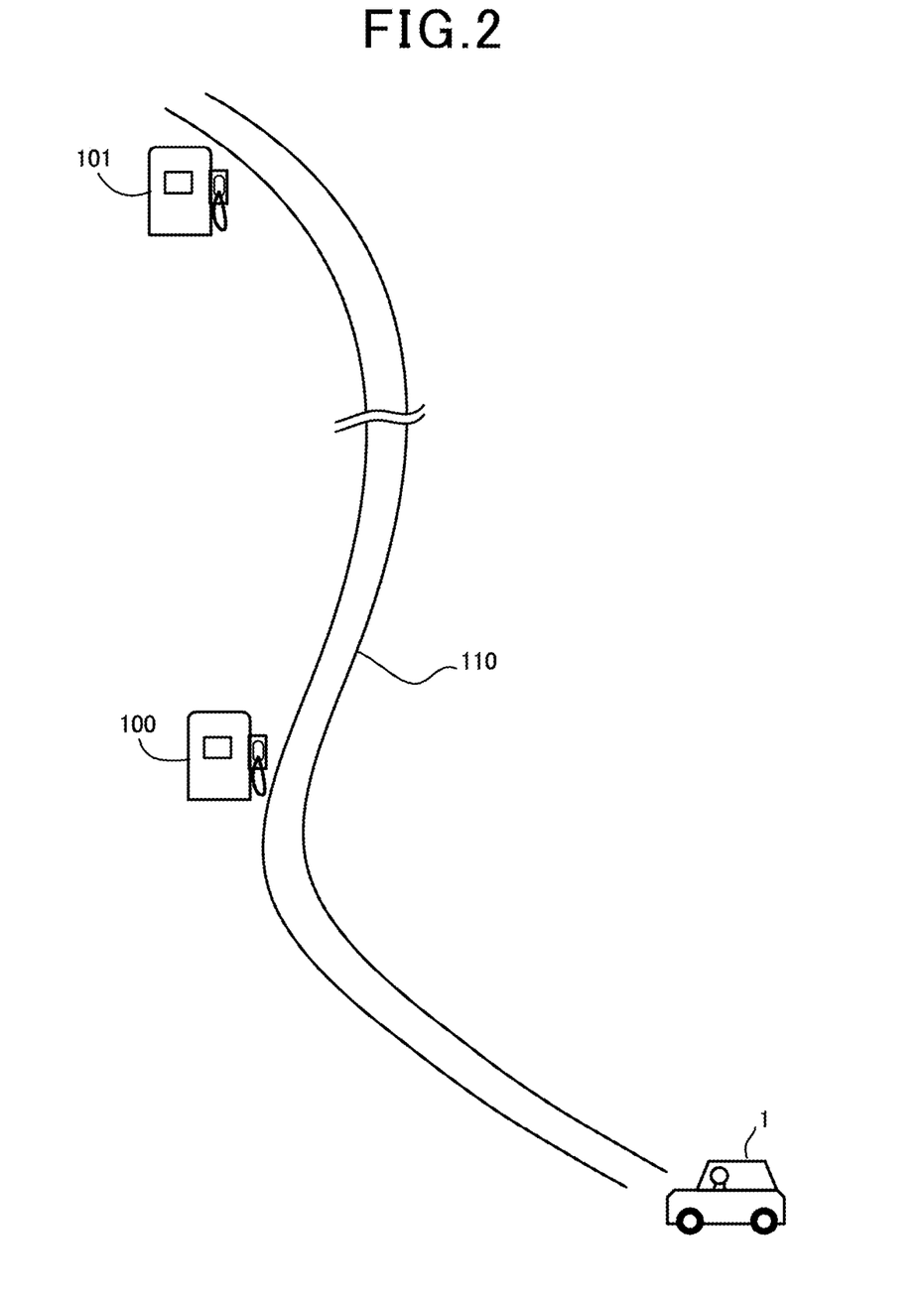
FIG. 2 is a diagram for describing a reachable charging station.

During running of the electric vehicle 1, the charging necessity determination section 23 calculates the remaining capacity (remaining charge amount) of the battery 66 based on, e.g., the voltage of the battery 66 detected by the battery voltage sensor 52 and determines whether or not it is necessary to charge the battery 66 at the reachable charging station. Here, FIG. 2 illustrate a closest charging station 100 and a next charging station 101 in the travel direction on a road 110 on which the electric vehicle 1 runs. Then, it is assumed that the closest charging station 100 is recognized as a reachable charging station by the reachable charging station recognition section 22 and the next charging station 101 is not recognized as a reachable charging station by the reachable charging station recognition section 22.

Since the closest charging station 100 is the only reachable charging station recognized by the reachable charging station recognition section 22, the charging necessity determination section 23 determines charging at the charging station 100 is necessary. In the below, the charging station 100 is also referred to as "reachable charging station 100".

Where the charging necessity determination section 23 determines that charging at the reachable charging station 100 is necessary and high-speed charging at the reachable charging station 100 is expected, the battery temperature control section 24 performs preliminary temperature adjustment processing for the battery 66. In the preliminary temperature adjustment processing, the battery temperature control section 24 actuates the circulation pump 72 or the battery heater 75 so that when the electric vehicle 1 arrives at the reachable charging station 100, the temperature of the battery 66 is within a suitable charging temperature range in which charging can efficiently be performed.

Figure 3:
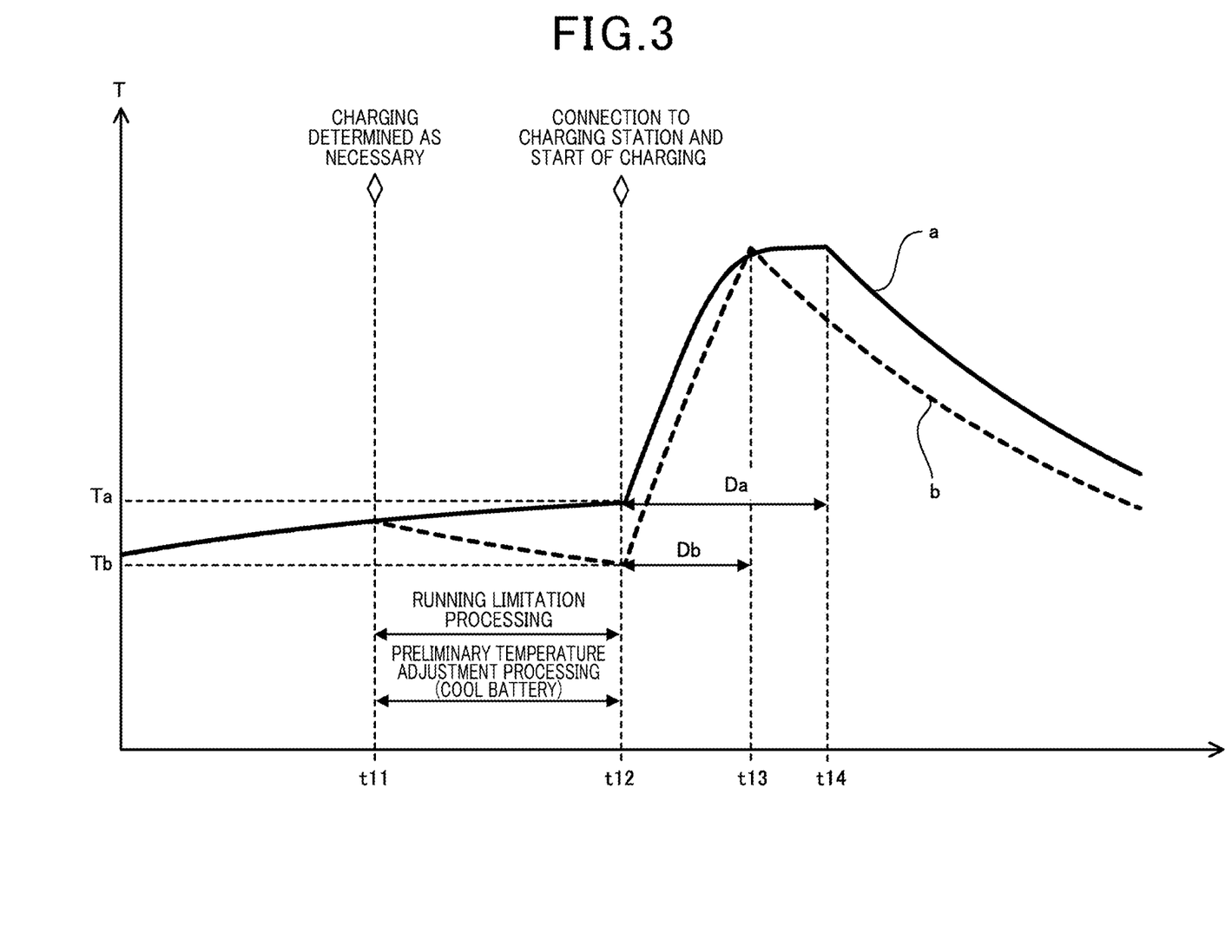
FIG. 3 is a diagram for describing illustrating an effect of preliminary temperature adjustment processing.

Here, FIG. 3 is a diagram for describing an effect when the circulation pump 72 is actuated to cool the battery 66 according to the preliminary temperature adjustment processing, with a temperature T of the battery set as the ordinate axis and time t set as the abscissa axis. Here, a indicates changes in temperature of the battery 66 where the preliminary temperature adjustment processing is not performed and b indicates changes in temperature of the battery 66 where the preliminary temperature adjustment processing is performed.

In FIG. 3, at t11, the charging necessity determination section 23 determines that charging at the reachable charging station 100 is necessary and starts the preliminary temperature adjustment processing by the battery temperature control section 24. Also, running limitation processing by the running control section 25 is also started. The running limitation processing will be described later.

Then, at t12, the electric vehicle 1 arrives at the reachable charging station 100 and fast charging of the battery 66 is started. If cooling of the battery 66 according to the preliminary temperature adjustment processing is performed, the temperature of the battery 66 is lowered to Tb as of t12. Therefore, fast charging is efficiently performed and time needed for the charging is Db (t12 to t13). On the other hand, where no cooling of the battery 66 according to the preliminary temperature adjustment processing is performed, the temperature of the battery 66 rises to Ta (>Tb) as of t12. Therefore, efficiency of fast charging is low and time needed for the charging is Da (t12 to t14), which is longer than Db. As described above, performance of the preliminary temperature adjustment processing enables reduction of time necessary for fast charging of the battery 66.

During the performance of the preliminary temperature adjustment processing by the battery temperature control section 24, the running control section 25 performs running limitation processing for limiting the speed of the electric vehicle 1 so that a remaining capacity securing condition for the battery 66, which is represented by expression (1) below is maintained. The left side of expression (1) corresponds to the estimated remaining capacity in the present invention.

[Expression 1]

$$CAP_t = CAP_{start} - CAP_{cooling} - CAP_{moving} > CAP_E \quad (1)$$

where $CAP_t$ is an estimated value of the remaining capacity of the battery 66 at the point of time of arrival of the electric vehicle 1 at the reachable charging station 100, $CAP_{start}$ is the remaining capacity of the battery 66 at the current point of time, $CAP_{cooling}$ is an estimated value of an amount of electricity supplied from the battery 66 to the circulation pump 72 according to the preliminary temperature adjustment processing until arrival of the electric vehicle 1 at the reachable charging station 100 (estimated temperature control electricity amount), $CAP_{moving}$ is an estimated value of an amount of electricity supplied from the battery 66 to the motor 63 via the motor driving circuit 65 until arrival of the electric vehicle 1 at the reachable charging station 100 (estimated running electricity amount) and $CAP_E$ is a remaining capacity criterion value.

The estimated temperature control electricity amount $CAP_{cooling}$ and the estimated running electricity amount $CAP_{moving}$ in expression (1) above can be calculated according to expression (2) and expression (3) below, respectively.

[Expression 2]

$$CAP_{cooling} = \int_{tstart}^{tqc} I_{cooling} dt \quad (2)$$

[Expression 3]

$$CAP_{moving} = \int_{tstart}^{tqc} I_{moving} dt \quad (3)$$

where tstart is a point of time of a start of the preliminary temperature adjustment processing, tqc is a point of time of arrival at the reachable charging station 100, $I_{cooling}$ is a current supplied to the circulation pump 72 and $I_{moving}$ is a current supplied to the motor 63.

The running control section 25 controls an output of the motor 63 according to an amount of operation of the acceleration pedal by a driver, the amount being detected by the acceleration amount sensor 51. Also, the running control section 25 sets an upper limit speed for the electric vehicle 1 to limit the current $I_{moving}$ supplied to the motor 63 so that expression (4) below holds.

[Expression 4]

$$CAP_{start} - CAP_E - CAP_{cooling} > CAP_{moving} \quad (4)$$

The left side of expression (4) above indicates a capacity of the battery 66 that can be used for running of the electric vehicle 1.

[2. Processing by the Battery Temperature Control Section and the Running Control Section]

Next, processing performed by the battery temperature control section 24 and processing by the running control section 25 will be described according to the flowcharts illustrated in FIGS. 4 and 5.

Figure 4:
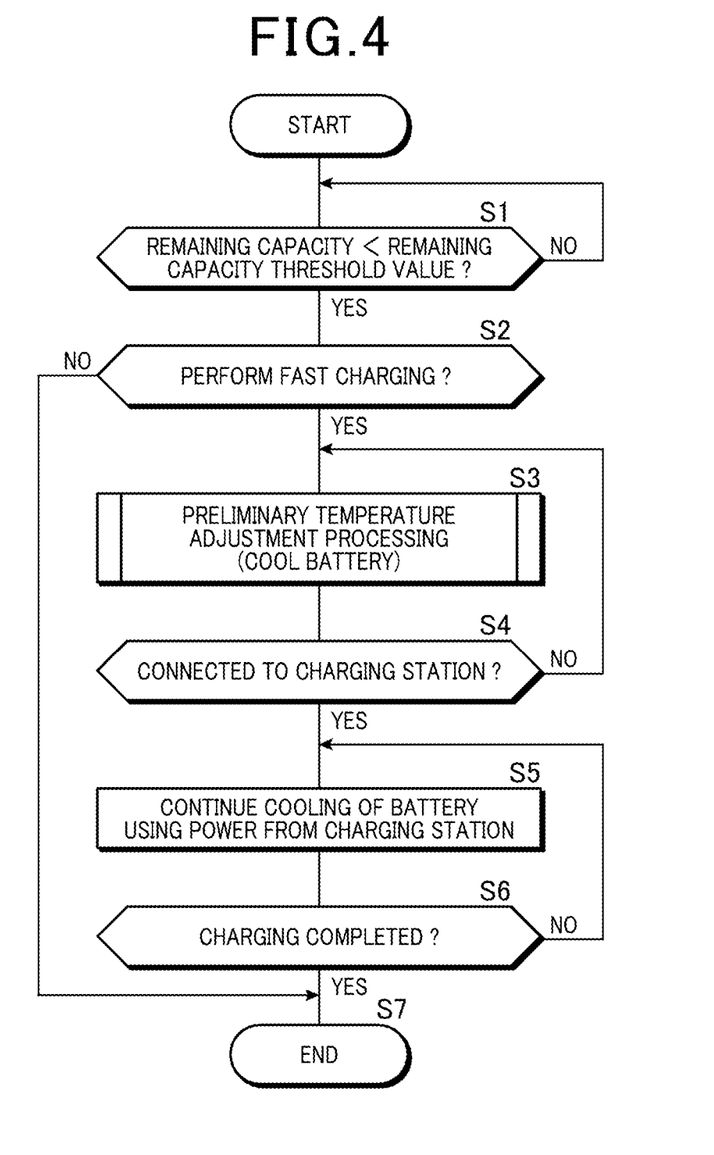
FIG. 4 is a flowchart of processing by a battery temperature control section.

The processing according to the flowchart illustrated in FIG. 4 is performed by the battery temperature control section 24. During running of the electric vehicle 1, if the charging necessity determination section 23 determines in step S1 that charging of the battery 66 at the reachable charging station 100 is necessary, the battery temperature control section 24 advances the processing to step S2.

In step S2, the battery temperature control section 24 determines whether or not to perform fast charging at the reachable charging station 100. Whether or not to perform fast charging is determined by an instruction from an occupant of the electric vehicle 1. The instruction from an occupant is provided by, e.g., a switch operation via a user interface (not illustrated) provided in the electric vehicle 1 or a voice input.

Then, if fast charging is performed, the battery temperature control section 24 advances the processing to step S3 and performs the preliminary temperature adjustment processing in step S3 until connection to the reachable charging station 100 is recognized in step S4. On the other hand, if no fast charging is performed, the battery temperature control section 24 advances the processing to S7, and in this case, performs no preliminary temperature adjustment processing.

Upon recognition of connection of the electric vehicle 1 with the reachable charging station 100 in step S4, the battery temperature control section 24 advances the processing to step S5. In step S5, the battery temperature control section 24 continuously actuates the circulation pump 72 using power supplied from the reachable charging station 100 to cool the battery 66 until recognition of completion of charging of the battery 66 in next step S6. Then, upon recognition of completion of charging of the battery 66 in step S6, the battery temperature control section 24 advances the processing to step S7 and ends the processing according to the flowchart in FIG. 4.

Figure 5:
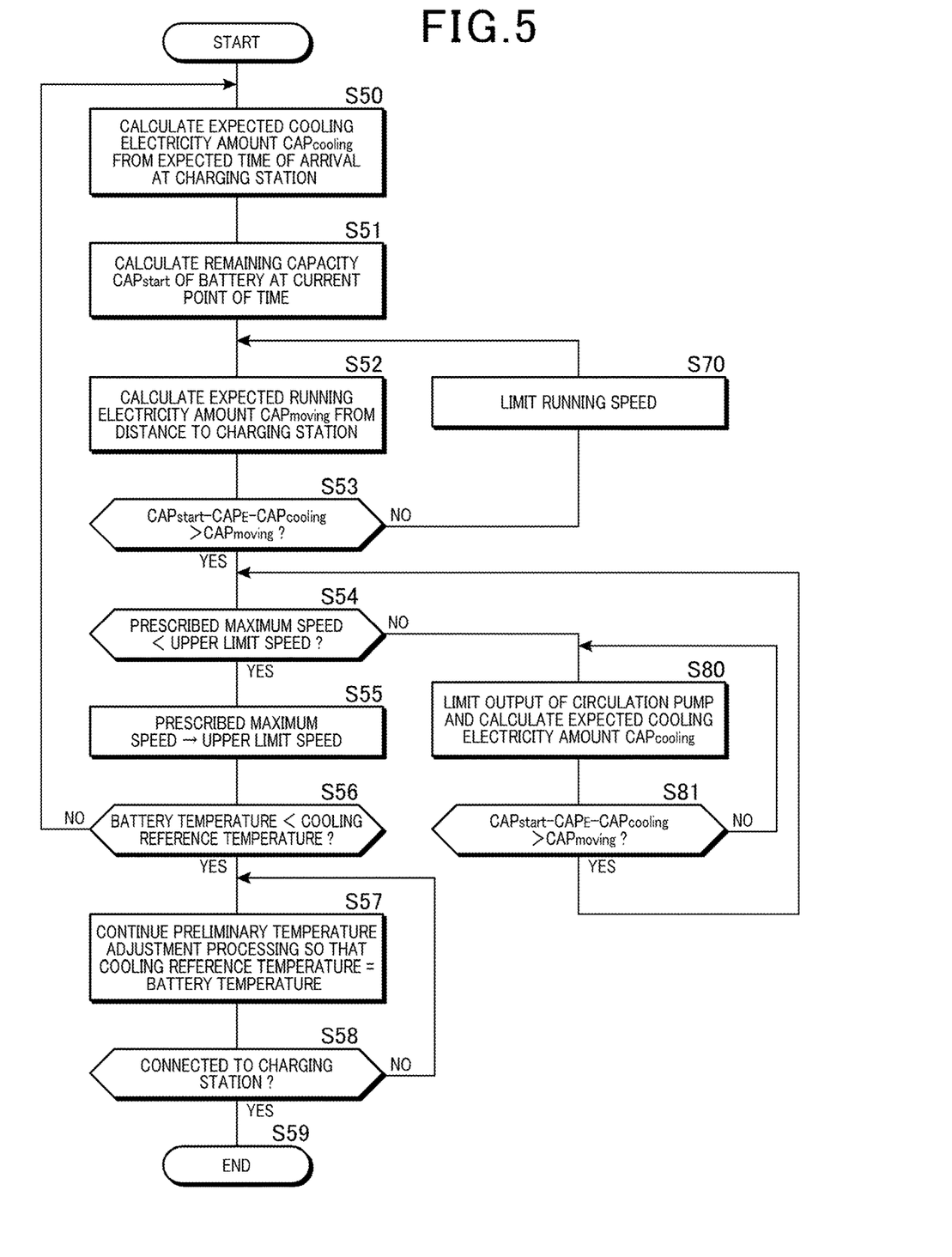
FIG. 5 is a flowchart of processing by a running control section.

Next, the processing according to the flowchart illustrated in FIG. 5 is performed by the running control section 25. The running control section 25 performs the processing according to the flowchart illustrated in FIG. 5 during performance of the preliminary temperature adjustment processing by the battery temperature control section 24. In step S50 in FIG. 5, the running control section 25 calculates an estimated temperature control electricity amount $CAP_{cooling}$ for cooling according to expression (2) above, based on an expected time of arrival at the reachable charging station 100.

In subsequent step S51, the running control section 25 calculates a current remaining capacity of the battery 66 based on the voltage of the battery 66 detected by the battery voltage sensor 52. Also, in step S52, the running control section 25 calculates an estimated running electricity amount $CAP_{moving}$ according to expression (3) above, based on, e.g., a distance from the current position of the electric vehicle 1 to the reachable charging station 100.

In next step S53, the running control section 25 determines whether or not the condition according to expression (4) above (remaining capacity securing condition) is met. Then, if the condition according to expression (4) above is met, the running control section 25 advances the processing to step S54, and if the condition according to expression (4) above is not met, the control section 25 advances the processing to step S70. In step S70, the running control section 25 lowers the upper limit speed of the electric vehicle 1 to decrease the estimated running electricity amount $CAP_{moving}$ and advances the processing to step S52. Here, the processing in steps S52, S53 and S70 corresponds to the running limitation processing in the present invention.

In step S54, the running control section 25 determines whether or not the upper limit speed set in step S70 exceeds a maximum speed (the prescribed maximum speed) prescribed for the road 110 on which the electric vehicle 1 runs (see FIG. 2). Then, if the upper limit speed exceeds the prescribed maximum speed, the running control section 25 advances the processing to step S55, and if the upper limit speed is equal to or below the prescribed maximum speed, the running control section 25 advances the processing to step S80.

In step S80, the running control section 25 provides an instruction to limit an output of the circulation pump 72, to the battery temperature control section 24, and calculates an estimated temperature control electricity amount $CAP_{cooling}$ according to expression (2) above. Then, in subsequent step S81, the running control section 25 determines whether or not the condition according to expression (4) above is met, and if the condition according to expression (4) above is met, advances the processing to step S54.

On the other hand, if the condition according to expression (4) above is not met, the running control section 25 advances the processing to step S80 and provides an instruction to further limit the output of the circulation pump 72, to the battery temperature control section 24. Consequently, until the condition according to expression (4) above is met, the degree of limitation of the output of the circulation pump 72 is increased, the estimated temperature control electricity amount $CAP_{cooling}$ is gradually decreased and the temperature of the battery 66 rises to the high temperature side of the suitable charging temperature range.

In this case, if the temperature of the battery 66 continues rising, the temperature of the battery 66 is maintained constant around an upper limit of the suitable charging temperature range by the preliminary temperature adjustment processing performed by the battery temperature control section 24 so that the temperature of the battery 66 does not exceed the suitable charging temperature range. Then, control is performed so that the upper limit speed comes close to the prescribed maximum speed.

If the upper limit speed exceeds the prescribed maximum speed in step S54 and the running control section 25 advances the processing to step S55, the running control section 25 lowers the upper limit speed to the prescribed maximum speed. Consequently, the estimated running electricity amount $CAP_{moving}$ is deceased, enabling provision of leeway for the remaining capacity of the battery 66.

In subsequent step S56, the running control section 25 determines whether or not the temperature of the battery 66 is lower than a cooling reference temperature. The cooling reference temperature is set within a temperature range in which efficiency of fast charging of the battery 66 is high (corresponding to the suitable charging temperature range in the present invention). Then, if the temperature of the battery 66 is lower than the cooling reference temperature, the running control section 25 advances the processing to step S57, and if the temperature of the battery 66 is equal to or exceeds the cooling reference temperature, the running control section 25 advances the processing to step S50.

In step S57, the running control section 25 provides an instruction to perform the preliminary temperature adjustment processing to the battery temperature control section 24 so that the temperature of the battery 66 becomes the cooling reference temperature. In subsequent step S58, the running control section 25 determines whether or not the electric vehicle 1 is connected to a charging station (here, the reachable charging station 100). Then, if the electric vehicle 1 is not yet connected to a charging station, the running control section 25 advances the processing to step S57. Consequently, the preliminary temperature adjustment processing is continued so that the temperature of the battery 66 is maintained at the cooling reference temperature by the processing in step 57 until connection of the electric vehicle 1 to a charging station. Also, if the electric vehicle 1 is connected to a charging station, the running control section 25 advances the processing to step S59 and ends the processing according to the flowchart in FIG. 5.

The running control section 25 successively determines whether or not the remaining capacity securing condition according to expression (4) above is maintained during performance of the processing in steps S57 and S58, and if the remaining capacity securing condition according to expression (4) above fails to be met, performs the processing from step S50 again.

Figure 6:
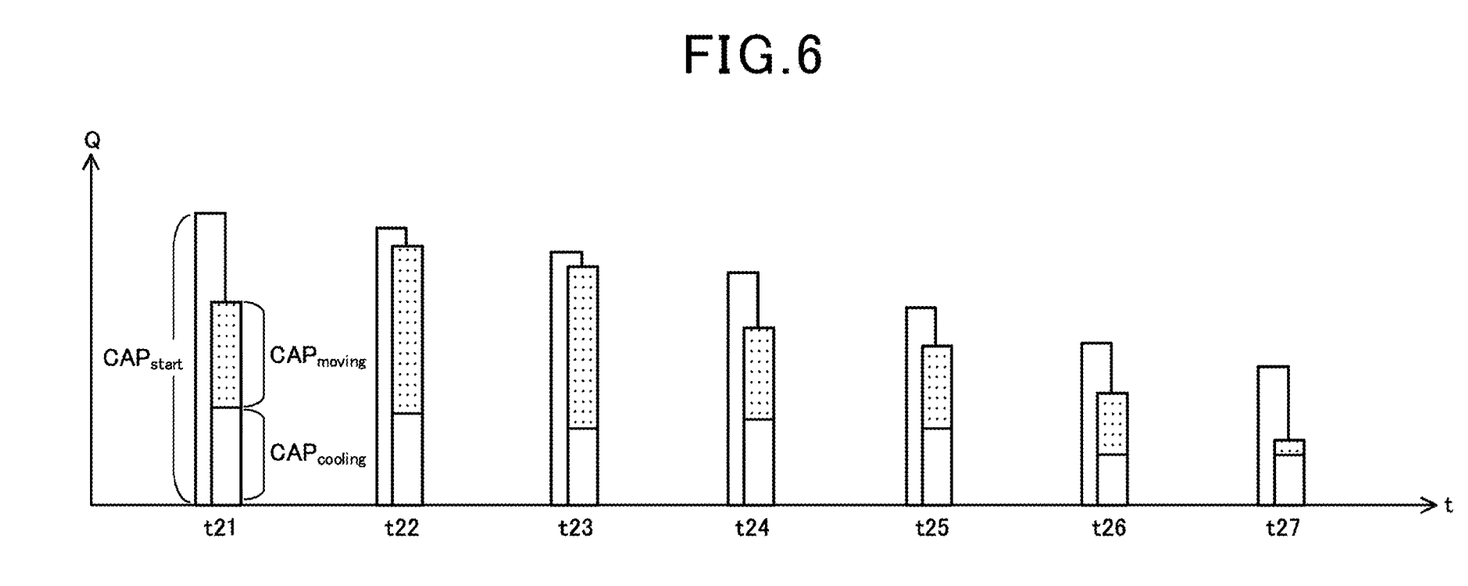
FIG. 6 is a diagram of changes in remaining capacity of a battery, estimated temperature control electricity amount and estimated running electricity amount.

Here, FIG. 6 is a diagram for describing illustrating an example of changes in remaining capacity $CAP_{start}$ estimated temperature control electricity amount $CAP_{cooling}$ and estimated running electricity amount $CAP_{moving}$ of the battery where the processing according to the flowchart in FIGS. 5 and 6 is performed, with an electricity amount (charge amount) Q set as the ordinate axis and time t set as the abscissa axis.

In FIG. 6, t21 is a point of time of a start of the preliminary temperature adjustment processing, t27 is a point of time of arrival of the electric vehicle 1 at the reachable charging station 100. During t21 to t27, the estimated running electricity amount $CAP_{moving}$ and the estimated temperature control electricity amount $CAP_{cooling}$ are adjusted so that the remaining capacity securing condition according to expression (4) above is maintained, ensuring that the electric vehicle 1 runs to the reachable charging station 100.

In t22 to t24, because of a temporary increase of the estimated running electricity amount $CAP_{moving}$ due to, e.g., running on a steep slope, the output of the circulation pump 72 is limited by the above-described processing in step S80 and the estimated temperature control electricity amount $CAP_{cooling}$ thus decreases. Also, if the temperature of the battery 66 becomes below the cooling reference temperature and the temperature of the battery 66 thus becomes stable, the preliminary temperature adjustment processing is performed by the above-described processing in step S57 so that the temperature of the battery 66 becomes the cooling reference temperature, and the output of the circulation pump 72 is thus suppressed to be low.

[3. Other Embodiments]

Although the above embodiment indicates the electric vehicle 1 that runs only via the motor 63 driven by power from the battery 66 as an electric vehicle according to the present invention, the present invention is applicable to any vehicle including a battery charging function. For example, the present invention is applicable to, e.g., a PHV (Plug-in Hybrid Vehicle) including an internal-combustion engine in addition to a motor.

The above embodiment has been described in terms of a situation in which the circulation pump 72 is actuated to cool the battery 66 according to the preliminary temperature adjustment processing so the temperature of the battery 66 falls within the suitable charging temperature range, assuming that the temperature of the battery 66 rises during running of the electric vehicle 1. On the other hand, where the electric vehicle 1 runs in an extremely low environment, it is assumed that the temperature of the battery 66 falls below the suitable charging temperature range. Then, in this case, the battery temperature control section 24 actuates the battery heater 75 to heat the battery 66 according to the preliminary temperature adjustment processing so that the temperature of the battery 66 is maintained to be at least equal to or exceed a lower limit of the suitable charging temperature range.

Although in the above embodiment, the running control section 25 limits the speed of the electric vehicle 1 in the running limitation processing, the running control section 25 may limit acceleration of the electric vehicle 1 or may limit both the speed and the acceleration of the electric vehicle 1.

Although in the above embodiment, the running control section 25 performs the running limitation processing for limiting the speed of the electric vehicle 1 as processing for maintaining the remaining capacity securing condition, instead of or in addition to the running limitation processing, information for urging a driving operation for decreasing a running electricity amount such as lowering a running speed to a predetermined speed or slowing down acceleration may be provided to the driver of the electric vehicle 1. The information may be provided via, e.g., a sound output or message display using a speaker (not illustrated) or an indicator (not illustrated) provided in an occupant cabin of the electric vehicle 1. As a result of a driving operation according to this information being performed, the speed of the electric vehicle 1 is lowered or sudden acceleration of the electric vehicle 1 is suppressed and the running electricity amount is thus decreased, making it possible to expect that the remaining capacity securing condition is maintained.

Although in the above embodiment, when the preliminary temperature adjustment processing is performed, the running control section 25 suppresses the upper limit speed of the electric vehicle 1 to be the prescribed maximum speed for the road on which the electric vehicle 1 runs, by means of the processing in steps S54 and S55 in FIG. 5, no such processing may be performed.

Although in the above embodiment, the output of the circulation pump in the preliminary temperature adjustment processing is limited by the processing in step S54 and steps S80 and S81 in FIG. 5 so that the speed limit of the electric vehicle 1 becomes the prescribed maximum speed for the road on which the electric vehicle 1 runs, no such processing may be performed.

Although in the above embodiment, the preliminary temperature adjustment processing is continued by the processing in steps S56 and S57 in FIG. 5 so that when the temperature of the battery 66 falls below the cooling reference temperature, the temperature of the battery 66 becomes the cooling reference temperature, no such processing may be performed.

Note that FIG. 1 is a schematic diagram illustrating functional configurations of the electric vehicle 1 and the electric vehicle control device 10, the functional configurations being sectioned according to main processing contents, for ease of understanding of the present invention, and configurations of the electric vehicle 1 and the electric vehicle control device 10 may be sectioned otherwise. Also, processing in each component may be performed by a single hardware unit or may be performed by a plurality of hardware units. Also, processing in each component may be performed according to a single program or may be performed according to a plurality of programs.

REFERENCE SIGNS LIST

1 . . . electric vehicle, 10 . . . electric vehicle control device, 20 . . . CPU, 21 . . . current position recognition section, 22 . . . reachable charging station recognition section, 23 . . . charging necessity determination section, 24 . . . battery temperature control section, 25 . . . running control section, 30 . . . memory, 31 . . . control program, 40 . . . navigation device, 41 . . . GPS unit, 42 . . . map data, 50 . . . vehicle speed sensor, 51 . . . acceleration amount sensor, 52 . . . battery voltage sensor, 53 . . . battery temperature sensor, 63 . . . motor, 65 . . . motor driving circuit, 66 . . . battery, 67 . . . charger, 68 . . . charging port, 70 . . . circulation channel, 71 . . . radiator, 72 . . . circulation pump, 75 . . . battery heater, 80 . . . communication section, 100 . . . reachable charging station

What is claimed is:

1. An electric vehicle control device including a battery, a battery temperature adjustment section that includes a battery heater and a radiator and is actuated by power supplied from the battery to heat or cool the battery and a motor that is actuated by power supplied from the battery, the electric vehicle control device comprising a processor that includes:
- a current position recognition section that detects a current position of an electric vehicle;
- a reachable charging station recognition section that recognizes a reachable charging station that is a charging station located in a direction of travel of the electric vehicle, the charging station being expected to be reachable based on a remaining capacity of the battery;
- a charging necessity determination section that determines whether or not charging of the battery at the reachable charging station is necessary;
- a battery temperature control section that during running of the electric vehicle, if the charging necessity determination section determines that charging of the battery at the reachable charging station is necessary, performs preliminary temperature adjustment processing for actuating the battery temperature adjustment section so that a temperature of the battery at a point of time of arrival of the electric vehicle at the reachable charging station is within a predetermined suitable charging temperature range; and
- a running control section that when the battery temperature control section performs the preliminary temperature adjustment processing, performs processing for adjusting an estimated running electricity amount and an estimated temperature control electricity amount so as to maintain a remaining capacity securing condition that an estimated remaining capacity is equal to or exceeds a remaining capacity criterion value, the estimated remaining capacity resulting from subtraction of the estimated running electricity amount that is an expected value of an amount of electricity supplied from the battery to the motor until arrival of the electric vehicle at the reachable charging station and the estimated temperature control electricity amount that is an expected value of an amount of electricity supplied from the battery to the battery temperature adjustment section until arrival of the electric vehicle at the reachable charging station from a remaining capacity of the battery at a current point of time.

2. The electric vehicle control device according to claim 1, wherein the running control section performs running limitation processing for limiting a speed or acceleration of the electric vehicle as the processing for maintaining the remaining capacity securing condition.

3. The electric vehicle control device according to claim 2, wherein when the battery temperature control section performs the preliminary temperature adjustment processing, if the remaining capacity securing condition can be maintained even though the electric vehicle runs at a speed exceeding a prescribed maximum speed for a road on which the electric vehicle runs, the running control section sets an upper limit speed of the electric vehicle as the prescribed maximum speed, in the running limitation processing.

4. The electric vehicle control device according to claim 2, wherein:
- in the preliminary temperature adjustment processing, the battery temperature control section actuates the battery temperature adjustment section until the temperature of the battery becomes at least equal to or below an upper limit of the suitable charging temperature range; and
- when the battery temperature control section performs the preliminary temperature adjustment processing, the running control section brings an upper limit speed of the electric vehicle close to a prescribed maximum speed for a road on which the electric vehicle runs in a state in which the temperature of the battery is maintained to be equal to or below the upper limit of the suitable charging temperature range, in the running limitation processing.

5. The electric vehicle control device according to claim 1, wherein in the preliminary temperature adjustment processing, when the battery temperature control section actuates the battery temperature adjustment section so that the temperature of the battery becomes at least equal to or below an upper limit of the suitable charging temperature range, if the temperature of the battery raises, the battery temperature control section actuates the battery temperature adjustment section so that the temperature of the battery becomes constant.

6. The electric vehicle control device according to claim 1, wherein in the preliminary temperature adjustment processing, if the temperature of the battery is lowered to a cooling reference temperature within the suitable charging temperature range, the battery temperature control section actuates the battery temperature adjustment section so that the temperature of the battery is maintained at the cooling reference temperature.

7. The electric vehicle control device according to claim 1, wherein when the battery temperature control section performs the preliminary temperature adjustment processing, the running control section performs the processing for maintaining the remaining capacity securing condition, by successively determining whether or not the remaining capacity securing condition is met until arrival of the electric vehicle at the reachable charging station.

* * * * *